Figure 1:
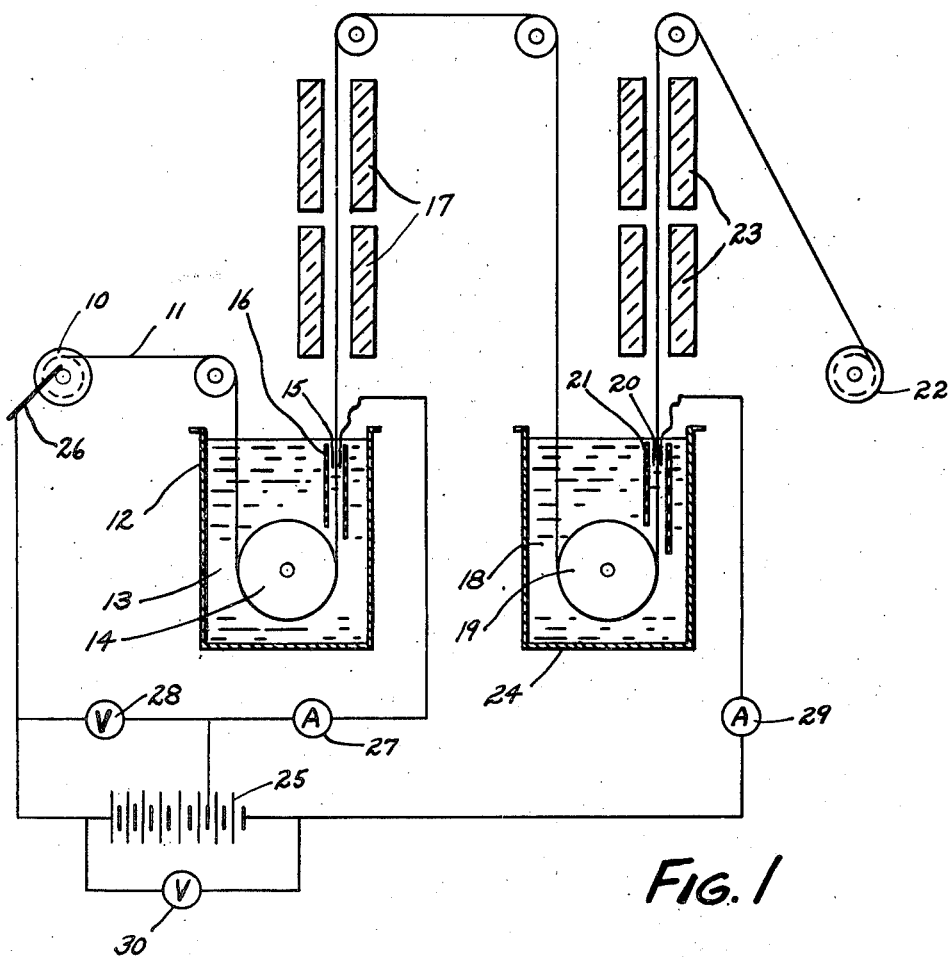

Aug. 9, 1949.   P. ROBINSON ET AL   2,478,322
PROCESS FOR PRODUCING IMPROVED ELECTRICAL CONDUCTORS
Filed Sept. 18, 1946

PRESTON ROBINSON
STANLEY O. DORST
INVENTORS

Patented Aug. 9, 1949

2,478,322

UNITED STATES PATENT OFFICE 2,478,322

PROCESS FOR PRODUCING IMPROVED ELECTRICAL CONDUCTORS

Preston Robinson, Williamstown, and Stanley O. Dorst, North Adams, Mass., assignors to Sprague Electric Company, North Adams, Mass., a corporation of Massachusetts Application September 18, 1946, Serial No. 697,772

6 Claims. (Cl. 204—181)

This invention relates to new and improved electrical conductors and more particularly refers to durable, highly flexible, abrasion-resistant, electrically-insulated conductors possessing certain desirable properties which are essential for commercial use, and processes for their production and use. This application is a continuation-in-part of our copending application Ser. No. 496,978, filed on August 2, 1943 (now U. S. Patent #2,421,652).

It was known that refractory, dielectric materials, such as glass, enamels and numerous ceramics, were of value in the insulation of electrical conductors. Conductors coated with these materials had excellent dielectric properties. Unfortunately, however, these products had very poor mechanical characteristics. As a result, in ordinary usage the dielectric coating would be broken or weakened, causing failure of the equipment in which it was used. The brittleness and general fragility of these products frequently more than offset the desirable electrical characteristics thereof.

In order to overcome the foregoing disadvantages various modifications were introduced into the processes whereby refractory coated conductors were produced. For example, it was attempted to improve the mechanical strength of the products by dipping them in solutions or suspensions of resinous materials. Where a concentrated solution or suspension was used the resulting product was thereby given a tough surface coating which, to a certain extent, protected it from surface abrasion. Unfortunately, however, this surface coating had little or no effect on the ability of the relatively fragile ceramic undercoating to withstand flexing or bending; in fact, when products of this type were bent, even to a slight extent, the underlying brittle ceramic coating would rupture and displace itself from portions of the conductor surface, thereby rendering the product unsatisfactory for further use. Where a dilute solution or suspension of resin was used, little or none of it was left on the surface of the coating, and the amount which went into the pores of the ceramic was so small that it was ineffective, particularly after the product was baked.

When it was realized that the problem involved more than mere protection of the surface of the ceramic coating, attempts were made to improve the coating itself. These attempts generally involved the incorporation in the ceramic coating of certain agents such as the hydrated silicates of the Bentonite type, or in lieu of such inorganic binders it was suggested that shellac or organic binders might be used. These coatings possess characteristics which constitute a considerable improvement over the prior art previously referred to. Despite this fact, however, their mechanical strength was still inadequate for many purposes and the coatings would rupture when subjected to severe flexing or bending. These coatings were, furthermore, defective in that many types of conductors, such as fine copper wires, could not withstand the high firing temperatures which were necessary to sinter the coating and permanently bond it to the conductor. The shortcomings in the improved coatings just referred to could not, unfortunately, be overcome as suggested, by applying thereto a surface coating of resinous materials. The defect was in the underlying refractory coating, and as in the case of the older products, the surface coating merely reduced the possibility of damage from surface abrasion.

It has also been suggested that the shellac or organic binders could be completely burned or volatilized from the coating following the deposition of the mixture of refractory and binder. This expedient, however, leaves the refractory coating more porous and fragile than if no shellac or organic binder had been used.

Another defect in the earlier processes was that the resulting coated conductor had weak spots, i. e., spots in which the coating was negligible or too thin to provide proper insulation for the conductor. The usual method for testing coated wire for weak spots was to run the wire through a mercury bath with the cell containing the mercury and the wire so electrically connected as to provide a complete circuit whenever the mercury touched an exposed portion of the wire surface. In this way the weak spots could be registered in some manner on a chart or similar recording device. However, when the wire was so tested, the time, labor and expense involved was large. Further, if the weak spots were to be recoated or removed, additional time, labor and expense was required. Because of these and other heretofore mentioned defects the manufacture of refractory insulated conductors was heretofore a time-consuming and expensive operation, and the products were far from satisfactory.

It is an object of this invention to overcome the foregoing disadvantages of the prior art and many other disadvantages which directly or indirectly result therefrom. A further object is to produce an entirely new dielectric coating which possesses all the advantages of prior art coatings without at the same time being subject to their disadvantages. A still further object is to produce coated electrical conductors having dielectric and mechanical properties which were heretofore unobtainable. A still further object is to produce coated electrical conductors which may be used for a wide variety of purposes wherein prior art conductors were of limited value because of their poor flexibility and mechanical strength. A still further object is to produce in one process superior coated electrical conductors.

Additional objects will become apparent from a consideration of the following description and claims.

These objects are attained in accordance with the present invention wherein a refractory coated conductor is treated to thoroughly impregnate the pores thereof with a resinous dielectric material. In a more restricted sense this invention is concerned with a process whereby an electrically conducting wire having a porous inorganic insulating coating is electrophoretically treated with a suspension of a resinous dielectric material to fill the pores thereof and bind the insulating particles together and to the wire. In a still more restricted sense the invention pertains to a process whereby an electrically conducting wire having a porous coating of sintered refractory dielectric material is provided with an electrophoretically deposited resinous material throughout the pores of the refractory dielectric coating. In its preferred embodiment this invention pertains to a process for producing improved insulated wires and other conductors which comprise electrophoretically depositing a refractory dielectric material upon the wire, sintering this coating and subsequently electrophoretically depositing a resinous dielectric material throughout substantially all the pores of the refractory coating, followed by heat treatment to give the resinous material optimum bonding effectiveness.

Any type of porous or semi-porous refractory insulation may be treated in accordance with the embodiments of this invention to produce insulating coatings of greatly improved abrasion-resistance, flexibility and durability. We have found that the most effective and practical manner of achieving a permanent and satisfactory bonding of refractory insulating particles to each other and to the electrical conductor thereunder is to electrophoretically deposit a resinous insulating material throughout the pores of the refractory coating. The initial refractory coating is preferably applied by electrophoretic means from a suspension or dispersion of refractory insulating particles. Processes of this nature are described in detail in U. S. Patent #2,213,969 and in copending patent applications bearing Serial Nos. 496,978, filed on August 2, 1943, by P. Robinson et al. (now U. S. Patent No. 2,421,652); 472,465, filed on January 15, 1943 by S. O. Dorst; and 536,448 filed on May 20, 1944 by S. O. Dorst.

Electrical conductors and semi-conductors suitable for treatment in accordance with the various embodiments of the invention are, for example, copper, nickel, nickel-chromium, beryllium-copper, iron-chromium, tantalum-iron-chromium, and the like. In fact, practically any type of electrically conducting or semi-conducting wire, plate, or bar may be treated in accordance herewith. Materials which do not respond readily to the electrophoretic treatment described herein may be plated with a thin layer of nickel, cadmium or similar conducting metal before being subjected to the described deposition treatment.

The types of refractory materials which may be deposited on the conductors and the methods of their deposition are extremely varied. The refractory materials comprise ceramic and/or vitreous materials generally. A few of the many materials falling within these categories are porcelain enamel, aluminum oxide, magnesium oxide, nickel oxide, zinc oxide, titanium dioxide, zirconium oxide, silicon dioxide, bentonite, china clay, talc, magnesium silicates, aluminum silicates, etc., insoluble borates of the materials previously referred to as metal oxides, insoluble titanates and tungstates, ground mica and related crystalline materials, etc. The foregoing and related materials may be used alone or in mixtures containing two or more of them. Various methods of application may be employed. One outstanding method is electrophoretic deposition from a suspension, dispersion, or emulsion thereof, as referred to previously in connection with issued patents and copending applications. The refractory coatings may also be applied by extrusion, by dipping the conductor in a suspension or paste of the dielectric material and subsequently drying out the coating, by spraying the conductor with finely divided particles of the refractory materials, by depositing the refractory particles with a binder on the conductor and subsequently volatilizing the binder, by electrolytically or chemically forming a porous metal oxide film from the conductor metal, etc. After deposition the coating should advisably be bonded to the wire by sintering or equivalent methods.

As indicated above, the method of forming the porous or semi-porous refractory coating is not critical. However, the method of improving the aforesaid refractory coating is a critical feature and the present invention is based on novel means therefor.

According to this invention a resinous dielectric material is thoroughly impregnated throughout the pores of the refractory insulating coating, preferably by electrophoretic deposition. Among the various resinous dielectric materials which have been found particularly suitable for processes of this nature are the resins generally known as silicones, and the polyvinyl type of resins. Silicones are the hydrolysis products of alkyl-, aralkyl- and aryl-chlor-silanes, and may be partially or substantially completely polymerized at the time of electrophoretic deposition. Polyvinyl type resins which have been found desirable include polyethylene, polyvinyl halides such as polyvinyl chloride and polytetrafluorethylene, aromatic vinyl polymers such as polystyrene and its various copolymers and derivatives, poly-n-vinyl pyrroles, poly esters such as the poly amides (nylon), polyacrylates, etc. Condensation resins such as the melamine formaldehyde resins, phenol formaledhyde resins and the like may also be employed. These resins may be used alone or two or more of them may be mixed or interpolymerized. Likewise plasticizers and other modifying agents may be added thereto if desired. Often employed in conjunction therewith are compounds which exhibit emulsifying properties useful in forming the electrophoretic emulsions as well as possessing lubricating and water-repellent properties desirable in the electrophoretically deposited resinous binder.

It is to be understood that the electrophoretic resin deposition referred to herein is applicable with suspensions, dispersions, emulsions, and related types of liquid-solid or liquid-liquid phases. For the purposes of definition the term "suspension" will be considered to embrace all of these phases.

Following electrophoretic deposition of the foregoing and/or other well-known resins, solvents or volatilizable suspension agents and the like may be removed by application of elevated temperatures. Further, in the case of polymerizable compounds or fusible compounds, polymerization and/or fusion may be effected by subjecting the conductors to elevated temperatures, for example temperatures from about 50° C. to 200° C. According to one of the preferred embodiments of the invention the heat-treatment step takes place in two separate phases. First, low temperatures are employed to remove the water solvents absorbed in and on the coating. Second, higher temperatures are employed to effect polymerization or further polymerization of the impregnating resinous material. Polymerization may be accomplished or accelerated in known manner, for instance, by use of ultra-violet light or polymerization catalysts which do not appreciably detract from the dielectric properties of the coating, represented by peroxides such as benzoyl peroxides, etc., for vinyl type compounds and organic metal catalysts such as lead naphthenate for the silicones.

Insulated conductors produced as aforesaid are amazingly durable and flexible. They have extremely small space factors and may be used for practically any purpose wherein insulated wires have previously been employed.

It is, of course, to be understood that after impregnation and final treatment of the impregnated coated product as aforesaid, one or more coats of resins, lubricants, etc., may be applied to the surface thereof by dipping, spraying, or in accordance with other well-known methods. However, due to the outstanding characteristics of the aforesaid coated conductors this is not necessary.

In the case where the coated conductor must be tested and all flaws or weak spots removed, it is preferable to use a method whereby the weak spots are automatically repaired by electrophoretically depositing therein and thereon additional resinous material in a simple and rapid process. This is accomplished by passing the coated and heat-treated conductor through a cell containing an emulsion of the resinous material as described heretofore. Electrophoretic deposition will occur only when the emulsion comes in contact with the conductor itself. Therefore the circuit is complete only when a weak spot is encountered and only the weak spots receive the additional deposit. The conductor is subsequently treated as previously explained and the final product is a flawless insulated conductor.

The invention will be further described with reference to the appended drawing forming part of the specification in which Figure 1 illustrates one form of apparatus suitable for producing electrically insulating conductors in accordance with the invention.

Figure 2:
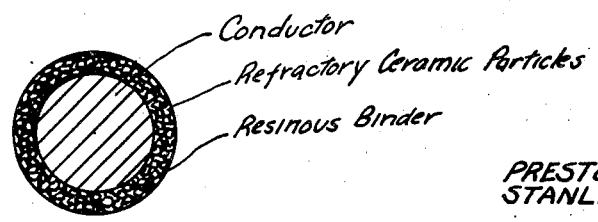

Figure 2 is a cross-sectional view on an enlarged scale showing a wire conductor provided with an insulating coating in accordance with the invention.

More specifically, Figure 1 shows a schematic diagram of a wire coating apparatus which may be employed in accordance with the invention to produce outstanding insulated conductors. 10 represents a supply spool from which wire 11 is unwound. Wire 11 passes into electrophoretic cell 12 containing a suspension 13 of refractory insulating particles and is reversed by pulley 14, passing up through a preferably cylindrical coating cathode 15, at which point electrophoretic deposition occurs. An insulating shield 16 surrounds cathode 15 to prevent the electrophortic process from occurring before the wire 11 passes over pulley 14. This embodiment prevents deposition before the wire passes over the pulley and insures a uniform, adherent electrophoretically deposited coating.

Following electrophoretic deposition on the wire 11 the latter is heat-treated in oven 17 through which it passes, to remove water or other liquids and to sinter the particles together.

Wire 11 then passes by means of pulleys into electrophoretic cell 24 containing a suspension 18 of resinous insulated material particles. The wire then passes around pulley 19 through the cylindrical coating cathode 20 which in turn is surrounded by insulating shield 21. Here the particles of resinous material are electrophoretically impregnated throughout the pores of the refractory insulation. The wire 11 then passes through oven 23 wherein water or other liquids may be removed from the coating and polymerization of the resinous binder effected. The wire then passes onto driving pulley 22 as a finished product.

The electrical circuit is as follows: the positive pole of a battery 25 or other power supply is connected to the wire 11 by means of a brush 26 on supply spool 10. The negative pole is connected to cathode 15 and to cathode 20 in coating cells 12 and 24 respectively. The current and voltage of electrophoretic deposition in cell 12 are measured by means of ammeter 27 and voltmeter 28. The current and voltage of electrophoretic deposition in cell 24 are measured by means of ammeter 29 and voltmeter 30. The current for electrophoretic impregnation of the porous coating with a resinous binder depends, of course, upon factors such as the original thickness of the coating, and the resistivity of the resinous suspension.

As a general rule, we prefer to employ low viscosity suspensions or emulsions. In the case of certain polyvinyl resins, such as polyvinylbutyral resins marketed under the trade name of "Formvar," we prefer to employ an emulsion containing about 2% of the polyvinyl resin, 8% resin solvents and 90% water. However, higher resin concentrations may be employed if desired.

The resistivity of the suspensions is preferably between 100 ohms per cubic centimeter and about 15,000 ohms per cubic cm.

The current employed may be varied widely. As a specific example, a ceramic coated wire traveling at a speed of 90 feet per minute may be treated in a suitable cell having a coating cathode 2 inches long and 1 inch in diameter with a current flow of about 5 milliamperes. The voltage employed is generally below 200 volts, although higher vaules may be used with thick ceramic coatings and/or when it is desired to deposit a superficial top coating.

The operation of the apparatus is as follows: Electrophoretic deposition of refractory particles takes place in cell 12, water and other liquids are removed and the coating sintered in oven 17, electrophoretic impregnation of the ports takes place in cell 24 and finally the solvents and the like are removed and the resinous impregnant cured and/or fused in oven 23.

If it is desired to test for weak spots and repair these as previously described, this may be done by passing the wire through another electrophoretic cell and oven set-up such as 24 and 23. Since the wire is already substantially completely insulated, only cracks and breaks will permit further electrophoretic deposition of the resin.

Figure 2 shows a cross-section of an electrical conductor provided with insulation in accordance with the invention. Ceramic particles are indicated with a resinous binder joining the former to each other and to the conductor.

As many apparently widely different embodiments of this invention may be made without departing from the spirit and scope thereof, it is to be understood that the invention is not limited to the specific embodiments thereof except as defined in the appended claims.

We claim:

1. A process for producing a durable, highly flexible, abrasion resistant, electrically insulated conductor which comprises electrophoretically depositing a synthetic resin throughout the porous insulation of a conductor coated with a bonded refractory material and bonding the so-deposited resin to said refractory insulation by heating.

2. A process for producing a durable, highly flexible, abrasion resistant, electrically insulated conductor which comprises electrophoretically depositing a synthetic resin throughout the porous insulation of a wire coated with a sintered refractory material and heating the resulting product to remove all liquids therefrom and bond the resin to the refractory material.

3. A process for producing a durable, highly flexible, abrasion resistant, electrically insulated conductor which comprises electrophoretically depositing a silicone resin throughout the porous insulation of a wire coated with a sintered refractory material and heating the resulting product to remove all liquids therefrom and bond the resin to the refractory material.

4. A process for producing a durable, highly flexible, abrasion resistant, electrically insulated conductor which comprises electrophoretically depositing a polyvinyl resin throughout the porous insulation of a wire coated with a sintered refractory material and heating the resulting product to remove all liquids therefrom and bond the resin to the refractory material.

5. A process for producing a durable, highly flexible, abrasion resistant, electrically insulated conductor which comprises electrophoretically depositing a uniform coating of refractory material on the surface of a wire, sintering said coating to bond it to the wire and produce a porous structure therethrough, electrophoretically depositing a synthetic resin throughout said porous structure and heating the resulting product to remove all liquids therefrom and bond the resin to the refractory material.

6. A process for producing a durable, highly flexible, abrasion resistant, electrically insulated conductor which comprises electrophoretically depositing a polyvinyl butyral resin throughout the porous insulation of a conductor coated with bonded China clay and talc and bonding the so-deposited resin to said China clay and talc by heating.

PRESTON ROBINSON.
STANLEY O. DORST.

REFERENCES CITED

The following references are of record in the file of this patent:

UNITED STATES PATENTS

| Number | Name | Date |
|---|---|---|
| 2,307,018 | Cardell | Jan. 5, 1943 |
| 2,421,652 | Robinson et al. | June 3, 1947 |

OTHER REFERENCES

Gemant, Industrial and Engineering Chemistry, vol. 31, (1939), pp. 1233–1236.